J. F. LACHMAN.
NUT LOCK.
APPLICATION FILED MAR. 18, 1908.
903,388.
Patented Nov. 10, 1908.
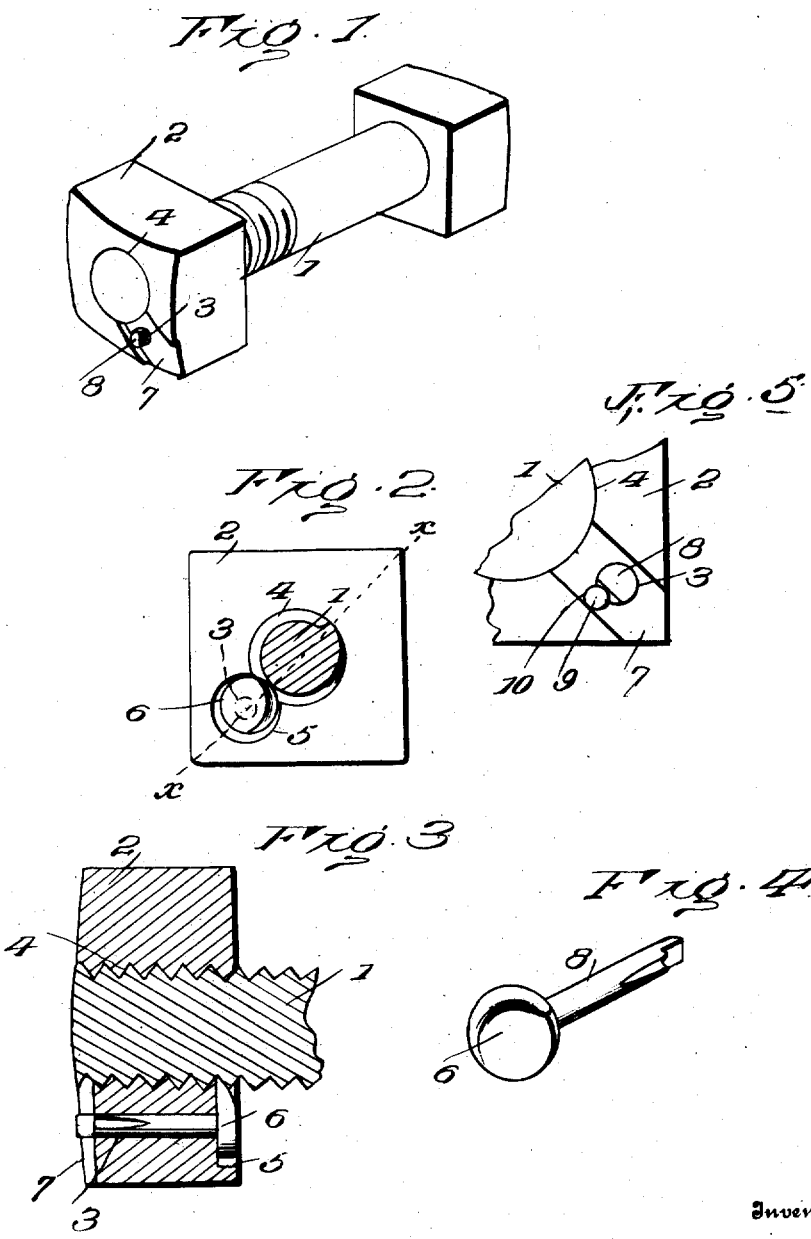

UNITED STATES PATENT OFFICE.

JOHN F. LACHMAN, OF WICHITA, KANSAS.

NUT-LOCK.

No. 903,388.

Specification of Letters Patent.

Patented Nov. 10, 1908.

Application filed March 18, 1908. Serial No. 421,899.

*To all whom it may concern:*

Be it known that I, JOHN F. LACHMAN, citizen of the United States, residing at Wichita, in the county of Sedgwick and State of Kansas, have invented certain new and useful Improvements in Nut-Locks, of which the following is a specification.

The present invention appertains to means for preventing the loosening of nuts or burs after the same have been tightened upon bolts, rods or like fastening means.

The invention combines with a nut or bur an eccentric having a portion adapted to match with a thread of the bolt opening of the nut and so arranged that the nut may be easily tightened upon the bolt or like part, but when turned backward the eccentric comes into play and binds upon the thread of the bolt, thereby retarding or preventing backward rotation of the nut and the consequent loosening of the fastening.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a nut lock embodying the invention. Fig. 2 is a view of the nut as seen from the inner side, showing the bolt in section. Fig. 3 is a section on the line x—x of Fig. 2. Fig. 4 is a detail perspective view of the locking eccentric. Fig. 5 is a detail view of a corner portion of the nut, showing more clearly the means for holding the eccentric in normal position.

Corresponding and like parts are referred to in the following description and indicated in all the views of the drawings by the same reference characters.

The bolt 1 is typical of the form of fastening adapted to receive a nut or bur 2, which, when tightened, is adapted to be locked against loosening by vibratory movement or other like cause.

The nut or bur 2 may be of usual construction and is provided with an opening 3 at one side of the bolt opening 4 and about parallel therewith. A recess 5 is formed upon the inner face of the nut or bur 2 in line with the opening 3 to receive the locking eccentric 6. A groove 7 is formed in the outer face of the nut or bur and intersects with the opening 3. The recess 5 extends into the bolt opening 4 to admit a part of the locking eccentric 6 engaging with the thread of the bolt 1 or like part.

The locking eccentric 6 has a stem 8 which is mounted in the opening 3 and constitutes a spindle for said locking eccentric. The active edge portion of the locking eccentric is inclined to correspond approximately to the pitch of the thread of the bolt opening 4 so as to admit of the nut or bur being readily tightened upon the bolt 1. When the eccentric is free to move or turn about its axis, any backward movement of the nut or bur after the same has been tightened will cause the eccentric to bind upon the thread of the bolt and resist the backward movement of the nut and lock the same to the bolt. However, should it be required to remove the nut, the eccentric is turned to normal position to disengage it from the thread of the bolt, thereby admitting of the removal of the nut. Any means may be employed to hold the eccentric in normal position, such for instance as a pin 9 inserted in an opening 10 formed part way in the nut and stem 8 so that the pin 9 extends across the joint formed between the stem 8 and the opening 3. A wrench or similar device may be fitted to the projecting end of the stem 8 to serve the same purpose, or the pin 9 may be fitted into the groove 7 and come between a wall thereof and a flattened side at the projecting end of the stem. When the nut is turned backward, the friction between the locking eccentric 6 and the thread of the bolt is sufficient to turn said eccentric and cause the same to bind the thread of the bolt and secure the nut against loosening. The recess 5 receives the locking eccentric 6, the latter being housed therein and confined between the work against which the nut is clamped and the inner wall of said recess. The projecting end of the stem 8 enables the eccentric to be turned to normal position and to be secured to hold the eccentric out of action when removing the nut from the bolt.

Having thus described the invention, what is claimed as new is:

1. In combination with a nut having an interiorly threaded bolt opening, a second opening at one side and paralleling the bolt opening, a recess in its inner face in line with said second opening, said nut also having a groove in its outer face in communication at its inner end with the bolt opening and intersecting the said second opening, an eccentric arranged in said recess and having a portion extended into the bolt opening to form a part of the thread thereof and adapted to bind against the thread of the bolt or like part to which the nut may be fitted, said eccentric having a stem which is mounted in the aforesaid second opening, and said stem having its end projected beyond the outer side of the nut and having a portion cut away at one side and adapted to coöperate with a fastening device to fix the position of the eccentric when turned to throw the eccentric out of engagement with the thread of the bolt.

2. In combination with a nut having an interiorly threaded bolt opening, a second opening at one side and paralleling the bolt opening, a recess in its inner face in line with said second opening, said nut also having a groove in its outer face in communication at its inner end with the bolt opening and intersecting the said second opening, an eccentric arranged in said recess and having a portion extended into the bolt opening to form a part of the thread thereof and adapted to bind against the thread of the bolt or like part to which the nut may be fitted, said eccentric having a stem which is mounted in the aforesaid second opening, and said stem having its end projected beyond the outer side of the nut and having a side of the projected end cut away and having a groove in a side adjacent to said cut away portion, both the groove and cut away portion adapted to receive and coöperate with a fastening device to hold the eccentric in normal position or out of binding engagement with the thread of the bolt.

In testimony whereof I affix my signature in presence of two witnesses.

JOHN F. LACHMAN. [L. S.]

Witnesses:
R. S. ELDER,
M. A. PARKER.